United States Patent
Zhang et al.

(10) Patent No.: US 10,321,498 B2
(45) Date of Patent: Jun. 11, 2019

(54) CO-FREQUENCY NETWORKING METHOD AND APPARATUS BASED ON CLUSTER SERVICE

(71) Applicant: Hytera Communications Corporation Limited, Shenzhen, Guangdong (CN)

(72) Inventors: Qingli Zhang, Guangdong (CN); Zhibing Lu, Guangdong (CN)

(73) Assignee: Hytera Communications Corporation Limited, Shenzhen, Guangdong (CN)

(*) Notice: Subject to any disclaimer, the term of this patent is extended or adjusted under 35 U.S.C. 154(b) by 0 days.

(21) Appl. No.: 15/737,734

(22) PCT Filed: Jun. 19, 2015

(86) PCT No.: PCT/CN2015/081956
§ 371 (c)(1),
(2) Date: Mar. 20, 2018

(87) PCT Pub. No.: WO2016/201700
PCT Pub. Date: Dec. 22, 2016

(65) Prior Publication Data
US 2018/0270881 A1    Sep. 20, 2018

(51) Int. Cl.
*H04W 76/12* (2018.01)
*H04H 20/67* (2008.01)
(Continued)

(52) U.S. Cl.
CPC ............ *H04W 76/12* (2018.02); *H04H 20/67* (2013.01); *H04L 1/00* (2013.01); *H04L 5/0023* (2013.01);
(Continued)

(58) Field of Classification Search
CPC ......... H04H 20/67; H04L 1/00; H04L 1/0813; H04L 43/16; H04L 5/0023; H04L 5/0035;
(Continued)

(56) References Cited

U.S. PATENT DOCUMENTS 9,537,549 B2* 1/2017 Bi .................... H04B 7/0452
10,142,082 B1* 11/2018 Shattil .................. H04L 5/0094
(Continued)

FOREIGN PATENT DOCUMENTS

| CN | 103856899 A | 6/2014 |
|---|---|---|
| CN | 103873116 A | 6/2014 |
| CN | 104683432 A | 6/2015 |

OTHER PUBLICATIONS

International Search Report for International Application No. PCT/CN2015/081956 dated Mar. 23, 2016.
(Continued)

*Primary Examiner* — Stephen J Clawson
(74) *Attorney, Agent, or Firm* — Wolf, Greenfield & Sacks, P.C.

(57) ABSTRACT

A method, an apparatus and a system for co-frequency networking based on a trunking service are provided. The method includes: acquiring a multi-layer data flow generated through a layer mapping process; pre-coding the multi-layer data flow with a preset multi-port pre-coding method to obtain encoded data of each of the transmission trunking ports, where the multi-port pre-coding method matches with the preset plurality of transmission trunking ports; performing resource mapping on the encoded data and the trunking-specific reference signal of each of the transmission trunking ports to obtain transmission data of the transmission trunking port; and transmitting the transmission data of each of the transmission trunking ports to reception trunking ports which match with the transmission trunking port using the transmission trunking port.

9 Claims, 7 Drawing Sheets

(51) Int. Cl.
| | |
|---|---|
| *H04L 1/00* | (2006.01) |
| *H04L 5/00* | (2006.01) |
| *H04W 4/08* | (2009.01) |
| *H04W 76/15* | (2018.01) |
| *H04L 12/24* | (2006.01) |
| *H04L 12/26* | (2006.01) |
| *H04W 24/08* | (2009.01) |
| *H04W 24/10* | (2009.01) |
| *H04W 72/08* | (2009.01) |

(52) U.S. Cl.
CPC .......... *H04L 5/0035* (2013.01); *H04L 5/0048* (2013.01); *H04L 41/0813* (2013.01); *H04L 43/16* (2013.01); *H04W 4/08* (2013.01); *H04W 24/08* (2013.01); *H04W 24/10* (2013.01); *H04W 72/085* (2013.01); *H04W 76/15* (2018.02); *H04L 5/0073* (2013.01)

(58) Field of Classification Search
CPC .... H04L 5/0048; H04L 5/0073; H04W 24/10; H04W 4/08; H04W 72/085; H04W 76/12; H04W 76/15
USPC .......................................................... 370/252
See application file for complete search history.

(56) References Cited

U.S. PATENT DOCUMENTS

| | | | |
|---|---|---|---|
| 2010/0027454 A1* | 2/2010 | Hou ....................... | H04B 7/024 370/312 |
| 2010/0195748 A1* | 8/2010 | Nam .................... | H04J 11/0069 375/260 |
| 2011/0200029 A1 | 8/2011 | Farmandar et al. | |
| 2011/0249767 A1* | 10/2011 | Chen ..................... | H04L 5/0023 375/295 |
| 2012/0033630 A1* | 2/2012 | Chung ................. | H04B 7/0473 370/329 |
| 2013/0039284 A1* | 2/2013 | Marinier ................. | H04L 5/001 370/329 |
| 2013/0329649 A1* | 12/2013 | Wernersson ............. | H01Q 3/00 370/329 |
| 2014/0233407 A1* | 8/2014 | Pourahmadi .......... | H04L 5/0007 370/252 |
| 2015/0009948 A1* | 1/2015 | Raaf ..................... | H04W 48/16 370/330 |
| 2015/0312924 A1 | 10/2015 | Yu et al. | |
| 2018/0287682 A1* | 10/2018 | Kwak ................. | H04B 7/0626 |

OTHER PUBLICATIONS

Written Opinion for International Application No. PCT/CN2015/081956 dated Mar. 23, 2016.

\* cited by examiner

CO-FREQUENCY NETWORKING METHOD AND APPARATUS BASED ON CLUSTER SERVICE

CROSS REFERENCE TO RELATED APPLICATIONS

This application is the national phase of International Application No. PCT/CN2015/081956, titled "CO-FREQUENCY NETWORKING METHOD AND APPARATUS BASED ON CLUSTER SERVICE", filed on Jun. 19, 2015, which is incorporated herein by reference in its entirety.

FIELD

The present disclosure relates to the technical field of communication, and in particular to a method and an apparatus for co-frequency networking based on a trunking service.

BACKGROUND

In order that a long term evolution (LTE) system can acquire a greater transmission bandwidth from limited spectrum resource, a co-frequency networking technology is generally used to improve spectrum utilization in the LTE system. A coordinated multiple points (CoMP) transmission technology is one of the common co-frequency networking technologies.

The CoMP transmission means that multiple transmission points such as base stations of different cells, which are geographically separated from each other, cooperatively transmit data to a same terminal through a physical downlink shared channel (PDSCH) or jointly receive data from a same terminal through a physical uplink shared channel (PUSCH). With the CoMP technology, an edge user equipment is configured to use the same time-frequency resource of multiple base stations of neighboring cells. The multiple base stations simultaneously transmit the same downlink data to the edge user equipment to improve spectrum utilization of the edge user equipment.

The CoMP transmission technology is generally used in combination with a beamforming technology for co-frequency networking. On reception of uplink data from a UE, each of the base stations estimates a downlink channel condition using a dedicated adjustment reference signal which is pre-negotiated with the UE and an uplink channel condition, encodes downlink data using the downlink channel condition and transmit the encoded downlink data to the UE. On reception of the downlink data, the UE decodes the downlink data using the dedicated adjustment reference signal to obtain the downlink data transmitted by the base station.

The co-frequency networking implemented using the CoMP transmission technology in combination with the beamforming technology is only applicable to a unicast UE, that is, it is only applicable to a case where a base station transmits downlink data to one UE. The base station estimates the downlink channel condition with the beamforming technology using the dedicated adjustment reference signal and the uplink channel condition on which the UE transmits the uplink data to the base station. However, in a trunking service system, the base station transmits downlink data to multiple UEs. In a case where the base station estimates the downlink channel condition with the beamforming technology, the base station can estimate the downlink channel condition using only the uplink channel condition on which one UE transmits the uplink data to the base station. The base station encodes the downlink data using the estimated downlink channel condition and transmits the encoded downlink data to multiple UEs. In this case, only the UE that provides the uplink channel condition to the base station can decode the downlink data at a high accuracy rate using the dedicated adjustment reference signal, while the other UEs decode downlink data at a high error rate. Therefore, the co-frequency networking implemented using the CoMP transmission technology in combination with the beamforming technology is not applicable to the trunking service. In the conventional technology, there is no co-frequency networking technology that can be implemented in the trunking service.

SUMMARY

The technical problem to be solved by the present disclosure is to provide a method and an apparatus for co-frequency networking based on a trunking service, with which the issue in the conventional technology that a terminal decodes transmission data transmitted from a base station at a high error rate in a trunking service can be solved.

In view of this, the following technical solutions are provided according to the present disclosure for solving the technical issue.

In a first aspect of the present disclosure, a method for co-frequency networking based on a trunking service is provided, where multiple transmission trunking ports are preset, and each of the transmission trunking ports is configured with a trunking-specific reference signal, the method includes:

acquiring a multi-layer data flow generated through a layer mapping process;

pre-coding the multi-layer data flow with a preset multi-port pre-coding method to obtain encoded data of each of the transmission trunking ports, where the multi-port pre-coding method matches with the preset multiple transmission trunking ports;

performing resource mapping on the encoded data and the trunking-specific reference signal of each of the transmission trunking ports to obtain transmission data of the transmission trunking port; and transmitting the transmission data of each of the transmission trunking ports to reception trunking ports which match with the transmission trunking port using the transmission trunking port, where the reception trunking ports which match with the transmission trunking port are provided on multiple user equipments (UEs) in a same group in a trunking system, and are configured with the same trunking-specific reference signal as the transmission trunking port.

In a first possible implementation of the first aspect, the performing resource mapping on the encoded data and the trunking-specific reference signal of each of the transmission trunking ports to obtain the transmission data of the transmission trunking port may include:

acquiring the encoded data of each of the transmission trunking ports and the trunking-specific reference signal configured for the transmission trunking port;

performing resource mapping on the trunking-specific reference signal configured for each of the transmission trunking ports to obtain a reference resource block of the transmission trunking port; and mapping the encoded data of each of the transmission trunking ports to a blank region of the reference resource block of the transmission trunking port to obtain the transmission data of the transmission trunking port, where the blank region of the reference resource block is a region of the reference resource block other than a region to which trunking-specific reference signals of all the transmission trunking ports are mapped and a region to which a cell reference signal is mapped.

In a second possible implementation of the first aspect, the pre-coding the multi-layer data flow with the preset multi-port pre-coding method may include:

pre-coding the multi-layer data flow with a two-port pre-coding method in a case where two transmission trunking ports are preset; and pre-coding the multi-layer data flow with a four-port pre-coding method in a case where four transmission trunking ports are preset.

In combination with the second possible implementation of the first aspect, in a third possible implementation of the first aspect, the pre-coding the multi-layer data flow with the two-port pre-coding method may include:

pre-coding the multi-layer data flow according to the following equation:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \operatorname{Re}[x^{(k)}(i)] \\ \operatorname{Re}[x^{(k+1)}(i)] \\ \operatorname{Im}[x^{(k)}(i)] \\ \operatorname{Im}[x^{(k+1)}(i)] \end{bmatrix};$$

where $y^{(A)}(2i)$ and $y^{(A)}(2i+1)$ are encoded data of a transmission trunking port A, $y^{(B)}(2i)$ and $y^{(B)}(2i+1)$ are encoded data of a transmission trunking port B, $\operatorname{Re}[x^{(0)}(i)]$ is a real component of i-th data in a first layer of the data flow, $\operatorname{Re}[x^{(1)}(i)]$ is a real component of i-th data in a second layer of the data flow, $\operatorname{Im}[x^{(0)}(i)]$ is an imaginary component of the i-th data in the first layer of the data flow, $\operatorname{Im}[x^{(1)}(i)]$ is an imaginary component of the i-th data in the second layer of the data flow, i=0, 1, 2 ..., M−1, j represents an imaginary component of a complex number, and M represents the number of pieces of data contained in each layer of the data flow, k=0, 1, 2 ..., N−1, N represents the number of layers of the data flow.

In combination with the second possible implementation of the first aspect, in a fourth possible implementation of the first aspect, the pre-coding the multi-layer data flow with the four-port pre-coding method may include:

pre-coding the multi-layer data flow according to the following equation:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} \operatorname{Re}[x^{(k)}(i)] \\ \operatorname{Re}[x^{(k+1)}(i)] \\ \operatorname{Re}[x^{(k+2)}(i)] \\ \operatorname{Re}[x^{(k+3)}(i)] \\ \operatorname{Im}[x^{(k)}(i)] \\ \operatorname{Im}[x^{(k+1)}(i)] \\ \operatorname{Im}[x^{(k+2)}(i)] \\ \operatorname{Im}[x^{(k+3)}(i)] \end{bmatrix};$$

where $y^{(A)}(4i)$, $y^{(A)}(4i+1)$, $y^{(A)}(4i+2)$ and $y^{(A)}(4i+2)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $\operatorname{Re}[x^{(0)}(i)]$ is a real component of i-th data in a first layer of the data flow, $\operatorname{Re}[x^{(1)}(i)]$ is a real component of i-th data in a second layer of the data flow, $\operatorname{Re}[x^{(2)}(i)]$ is a real component of i-th data in a third layer of the data flow, $\operatorname{Re}[x^{(3)}(i)]$ is a real component of i-th data in a forth layer of the data flow, $\operatorname{Im}[x^{(0)}(i)]$ is an imaginary component of the i-th data in the first layer of the data flow, $\operatorname{Im}[x^{(1)}(i)]$ is an imaginary component of the i-th data in the second layer of the data flow, $\operatorname{Im}[x^{(2)}(i)]$ is an imaginary component of the i-th data in the third layer of the data flow, $\operatorname{Im}[x^{(3)}(i)]$ is an imaginary component of the i-th data in the third layer of the data flow, i=0, 1, 2 ..., M−1, j represents an imaginary component of a complex number, M represents the number of pieces of data contained in each layer of the data flow, k=0, 1, 2 ..., N−1, N represents the number of layers of the data flow.

A method for co-frequency networking based on a trunking service is provided according to a second aspect of the present disclosure, where multiple reception trunking ports are preset, and each of the reception trunking ports is configured with a trunking-specific reference signal, the method includes:

receiving, by each of the reception trunking ports, the same transmission data transmitted by transmission trunking ports of multiple base stations in a trunking system which match with the reception trunking port, the transmission trunking ports which match with the reception trunking port are configured with the same trunking-specific reference signal as the reception trunking port;

demodulating, by each of the reception trunking ports, the transmission data received by the reception trunking port using the trunking-specific reference signal configured for the reception trunking port, to obtain encoded data of the reception trunking port; and decoding the encoded data of each of the reception trunking ports with a decoding method corresponding to a multi-port pre-coding method to obtain a multi-layer data flow.

A base station for co-frequency networking based on a trunking service is provided according to a third aspect of the present disclosure, which includes a processor and multiple transmission trunking ports, where each of the transmission trunking ports is configured with a trunking-specific reference signal; and the processor is configured to:
acquire a multi-layer data flow generated through a layer mapping process,
pre-code the multi-layer data flow with a preset multi-port pre-coding method to obtain encoded data of each of the transmission trunking ports, where the multi-port pre-coding method matches with the preset multiple transmission trunking ports,
perform resource mapping on the encoded data and the trunking-specific reference signal of each of the transmission trunking ports to obtain transmission data of the transmission trunking port, and
transmit the transmission data of each of the transmission trunking ports to the transmission trunking port; and each of the transmission trunking ports is configured to:
receive the transmission data transmitted by the processor, and transmit the received transmission data to reception trunking ports which match with the transmission trunking port using the transmission trunking port, where the reception trunking ports which match with the transmission trunking port are provided on multiple user equipments UEs in a same group in a trunking system, and are configured with the same trunking-specific reference signal as the transmission trunking port.

In a first possible implementation of the third aspect of the present disclosure, for performing resource mapping on the encoded datatrunking and the trunking-specific reference signal of each of the transmission trunking ports to obtain the transmission data of the transmission trunking port, the processor may be configured to:

acquire the encoded data of each of the transmission trunking ports and the trunking-specific reference signal configured for the transmission trunking port;

perform resource mapping on the trunking-specific reference signal configured for each of the transmission trunking ports to obtain a reference resource block of the transmission trunking port; and map the encoded data of each of the transmission trunking ports to a blank region of the reference resource block of the transmission trunking port to obtain transmission data of the transmission trunking port, where the blank region of the reference resource block is a region of the reference resource block other than a region to which trunking-specific reference signals of all the transmission trunking ports are mapped and a region to which a cell reference signal is mapped.

In a second possible implementation of the third aspect of the present disclosure, for pre-coding the multi-layer data flow with the preset multi-port pre-coding method, the processor may be configured to:

pre-code the multi-layer data flow with a two-port pre-coding method in a case where two transmission trunking ports are preset; and pre-code the multi-layer data flow with a four-port pre-coding method in a case where four transmission trunking ports are preset.

In combination with the second possible implementation of the third aspect of the present disclosure, in a third possible implementation of the third aspect, for pre-coding the multi-layer data flow with the two-port pre-coding method, the processor may be configured to pre-code the multi-layer data flow according to the following equation:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} Re[x^{(k)}(i)] \\ Re[x^{(k+1)}(i)] \\ Im[x^{(k)}(i)] \\ Im[x^{(k+1)}(i)] \end{bmatrix};$$

where $y^{(A)}(2i)$ and $y^{(A)}(2i+1)$ are encoded data of a transmission trunking port A, $y^{(B)}(2i+1)$ are encoded data of a transmission trunking port B, $Re[x^{(0)}(i)]$ is a real component of i-th data in a zero layer of the data flow, $Re[x^{(1)}(i)]$ is a real component of i-th data in a first layer of the data flow, $Im[x^{(0)}(i)]$ is an imaginary component of the i-th data in the zero layer of the data flow, $Im[x^{(1)}(i)]$ is an imaginary component of the i-th data in the first layer of the data flow, i=0, 1, 2 . . . , M−1, j represents an imaginary component of a complex number, and M represents the number of pieces of data contained in each layer of the data flow, k=0, 1, 2 . . . , N−1, N represents the number of layers of the data flow.

In combination with the second possible implementation of the third aspect of the present disclosure, in a fourth possible implementation of the third aspect, for pre-coding the multi-layer data flow with the four-port pre-coding method, the processor may be configured to pre-code the multi-layer data flow according to the following equation:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} Re[x^{(k)}(i)] \\ Re[x^{(k+1)}(i)] \\ Re[x^{(k+2)}(i)] \\ Re[x^{(k+3)}(i)] \\ Im[x^{(k)}(i)] \\ Im[x^{(k+1)}(i)] \\ Im[x^{(k+2)}(i)] \\ Im[x^{(k+3)}(i)] \end{bmatrix};$$

where $y^{(A)}(4i)$, $y^{(A)}(4i+1)$, $y^{(A)}(4i+2)$ and $y^{(A)}(4i+2)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $Re[x^{(0)}(i)]$ is a real component of i-th data in a first layer of the data flow $Re[x^{(1)}(i)]$ is a real component of i-th data in a second layer of the data flow, $Re[x^{(2)}(i)]$ is a real component of i-th data in a third layer of the data flow, $Re[x^{(3)}(i)]$ is a real component of i-th data in a forth layer of the data flow, $Im[x^{(0)}(i)]$ is an imaginary component of the i-th data in the first layer of the data flow, $Im[x^{(1)}(i)]$ is an imaginary component of the i-th data in the second layer of the data flow, $Im[x^{(2)}(i)]$ is an imaginary component of the i-th data in the third layer of the data flow, $Im[x^{(3)}(i)]$ is an imaginary component of the i-th data in the third layer of the data flow, i=0, 1, 2 . . . , M−1, j represents an imaginary component of a complex number, M represents the number of pieces of data contained in each layer of the data flow, k=0, 1, 2 . . . , N−1, N represents the number of layers of the data flow.

A terminal for co-frequency networking based on a trunking service is provided according to a fourth aspect of the present disclosure, which includes multiple reception trunking ports and a processor, where:

each of the reception trunking ports is configured with a trunking-specific reference signal, and is configured to:

receive the same transmission data transmitted by transmission trunking ports of multiple base stations in a trunking system which match with the reception trunking port, and transmit the received transmission data to the processor, where the transmission trunking ports which match with the reception trunking port are configured with the same trunking-specific reference signal as the reception trunking port; and the processor is configured to:

receive the transmission data transmitted by each of the reception trunking ports, demodulate the transmission data received by each of the reception trunking ports using the trunking-specific reference signal configured for the trunking port, to obtain encoded data of the reception trunking port, and decode the encoded data of each of the reception trunking ports with a decoding method corresponding to a multi-port pre-coding method to obtain a multi-layer data flow.

A system for co-frequency networking based on a trunking service is provided according to a fifth aspect of the present disclosure, which includes multiple base stations for co-frequency networking based on a trunking service according to any one of the third aspect to the fourth implementation of the third aspect, and a user equipment UE group including multiple terminals for co-frequency networking based on a trunking service according to the fourth aspect of the present disclosure, where the number of transmission trunking ports of the base station is the same as the number of reception trunking ports of the terminal, the transmission trunking ports of the base station match with the reception trunking ports of the terminal respectively, and the transmission trunking port is configured with the same trunking specific adjustment signal as the reception trunking port which matches with the transmission trunking port;

each of the transmission trunking ports of the base stations transmits the same transmission data to the reception trunking ports of all of the terminals in the UE group which match with the transmission trunking port; and each of the reception trunking ports of the terminals in the UE group receives the same transmission data transmitted by transmission trunking ports of all of the base stations which match with the reception trunking port.

As can be seen from the above technical solutions, the present disclosure has the following beneficial effects.

A method, an apparatus and a system for co-frequency networking based on a trunking service are provided according to the embodiments of the present disclosure. Multiple transmission trunking ports are preset on a base station, and multiple reception trunking ports are preset on a terminal. Each of the transmission trunking ports matches with one of the reception trunking ports, and the transmission trunking port and the reception trunking port which match with each other are configured with the same trunking-specific reference signal. The base station acquires a multi-layer data flow generated through a mapping process; pre-codes the multi-layer data flow with a preset multi-port pre-coding method to obtain encoded data of each of the transmission trunking ports; performs resource mapping on the encoded data and the trunking-specific reference signal of each of the transmission trunking ports to obtain transmission data of the transmission trunking port; and transmits the transmission data of each of the transmission trunking ports to a reception trunking ports of multiple UEs in a same group of a trunking system which match with the transmission trunking port using the transmission trunking port. The multi-layer data flow generated through the layer mapping process is pre-coded with the multi-port pre-coding method to obtain encoded data of each of the transmission trunking ports, thus data redundancy of the encoded data is increased as compared with that of the original multi-layer data flow. The resource mapping is performed on the encoded data to obtain transmission data of multiple transmission trunking ports, and data in each layer of the data flow is divided into multiple parts which are separately transmitted to the UE, thereby further increasing data redundancy. The pre-coding technology is combined with the transmission technology based on multiple transmission trunking ports, thereby increasing data redundancy of the transmission data received by the UE and improving the accuracy rate at which the UE decodes the transmission data. Multiple base stations simultaneously transmit the same data to multiple UEs in a trunking service system with the above method for co-frequency networking based on a trunking service, thereby implementing co-frequency networking technology in a trunking service system, thus spectrum utilization in the LTE system is improved.

BRIEF DESCRIPTION OF THE DRAWINGS

The drawings to be used in the description of the embodiments of the disclosure or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

FIG. 2 (1) is a schematic diagram showing a configuration example of a trunking-specific reference signal for a port 1 according to the present disclosure;

FIG. 2 (2) is a schematic diagram showing a configuration example of a trunking-specific reference signal for a port 2 according to the present disclosure;

FIG. 2 (3) is a schematic diagram showing a configuration example of a trunking-specific reference signal for a port 3 according to the present disclosure;

FIG. 2 (4) is a schematic diagram showing a configuration example of a trunking-specific reference signal for a port 4 according to the present disclosure;

DETAILED DESCRIPTION OF EMBODIMENTS

A method and an apparatus for co-frequency networking based on a trunking service are provided according to embodiments of the present disclosure, with which data redundancy of transmission data received by a UE can be increased, and the accuracy rate at which the UE decodes the transmission data can be improved, thus the co-frequency networking technology can be implemented in a trunking service system, thereby improving spectrum utilization in an LTE system.

In the co-frequency networking technology according to the conventional technology, base stations of multiple cooperative cells coordinately transmit data to a same terminal UE via PDSCH. In the CoMP technology, each of the base stations receives data transmitted from the UE via PUSCH, estimates a downlink channel condition based on the uplink data transmitted by the UE using a dedicated adjustment reference signal which is pre-negotiated with the UE and an uplink channel condition, encodes downlink data using the downlink channel condition, and transmits the encoded downlink data to the UE.

However, in a trunking service system, a base station transmits downlink data to multiple UEs, and receives uplink data transmitted by the multiple UEs. Each time before transmitting the downlink data, the base station estimates the downlink channel condition using only the uplink data transmitted by one UE with a beamforming technology. For multiple UEs in a trunking service system, only one UE decodes the downlink data transmitted by the base station with a high decoding accuracy, and the other UEs decode the downlink data transmitted by the base station at a high error rate. Therefore, in the trunking service system, the co-frequency networking technology cannot be implemented with the beamforming technology.

The embodiments of the present disclosure are described in detail below with reference to the accompanying drawings.

First Embodiment

Figure 1:
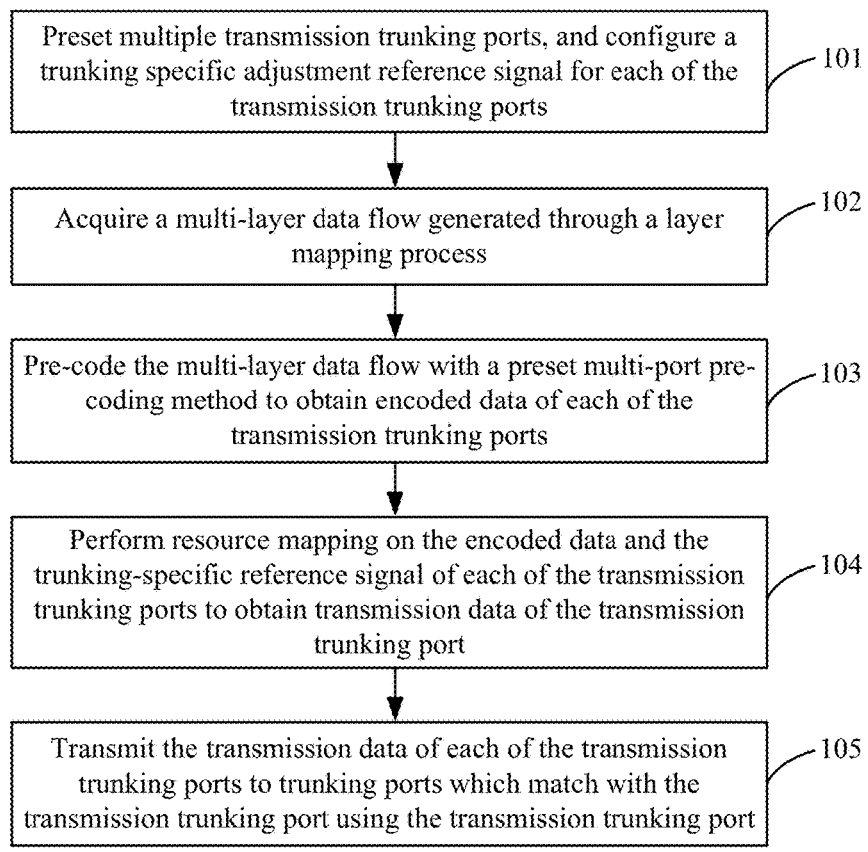
FIG. 1 is a flow chart of a method for co-frequency networking based on a trunking service according to a first embodiment of the present disclosure.

FIG. 1 is a flow chart of a method for co-frequency networking based on a trunking service according to a first embodiment of the present disclosure, which can be applied to a base station of the trunking service, the method includes the following steps 101 105.

In step 101, multiple transmission trunking ports are preset, and each of the transmission trunking ports is configured with a trunking-specific reference signal.

In order to implement the co-frequency networking technology in the trunking service, each of the base stations in multiple cells which cooperate with each other is provided with a transmission trunking port group, and the transmission trunking port groups configured for the base stations include the same number of transmission trunking ports. Each of transmission trunking ports in each transmission trunking port group is configured with a trunking-specific reference signal, and the transmission trunking ports in the same group are configured with different trunking-specific reference signals. Transmission trunking port groups of the base stations of the multiple cells which cooperate with each other are configured with the same group of trunking-specific reference signals, and the trunking-specific reference signals respectively correspond to the transmission trunking ports provided on the base station.

For example, a case where base stations of three cells which cooperate with each other of are respectively a base station A, a base station B and a base station C, and each of the base stations is provided with four transmission trunking ports is described as an example. The base station A is provided with four transmission trunking ports A1, A2, A3 and A4, where the transmission trunking port A1 is configured with a trunking-specific reference signal R1, the transmission trunking port A2 is configured with a trunking-specific reference signal R2, the transmission trunking port A3 is configured with a trunking-specific reference signal R3, and the transmission trunking port A4 is configured with a trunking-specific reference signal R4. The base station B is provided with four transmission trunking ports B1, B2, B3 and B4, where the transmission trunking port B1 is configured with the trunking-specific reference signal R1, the transmission trunking port B2 is configured with the trunking-specific reference signal R2, the transmission trunking port B3 is configured with the trunking-specific reference signal R3, and the transmission trunking port B4 is configured with the trunking-specific reference signal R4. The base station C is provided with four transmission trunking ports C1, C2, C3 and C4, where the transmission trunking port C1 is configured with the trunking-specific reference signal R1, the transmission trunking port C2 is configured with the trunking-specific reference signal R2, the transmission trunking port C3 is configured with the trunking-specific reference signal R3, and the transmission trunking port C4 is configured with the trunking-specific reference signal R4. It can be seen from the above example that the base stations which cooperate with each other are provided with the same number of transmission trunking ports, and use the same group of trunking-specific reference signals R1, R2, R3 and R4. In practice, the number of base stations of cooperative cells, the number of transmission trunking ports provided on each of the base stations, and the trunking-specific reference signal configured for each of the transmission trunking ports may be set based on actual conditions.

Figures 2(1), 2(2):
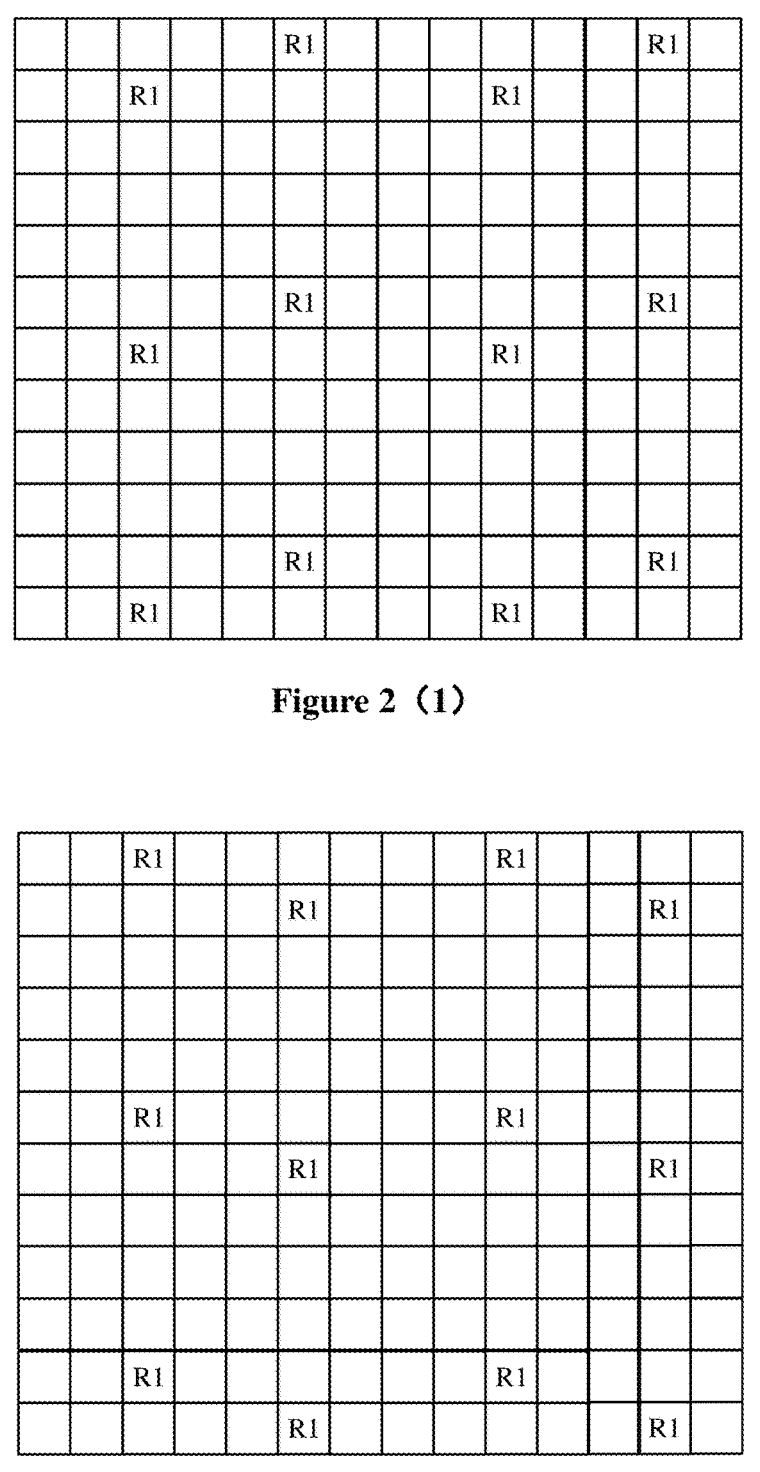
Figures 2(3), 2(4):
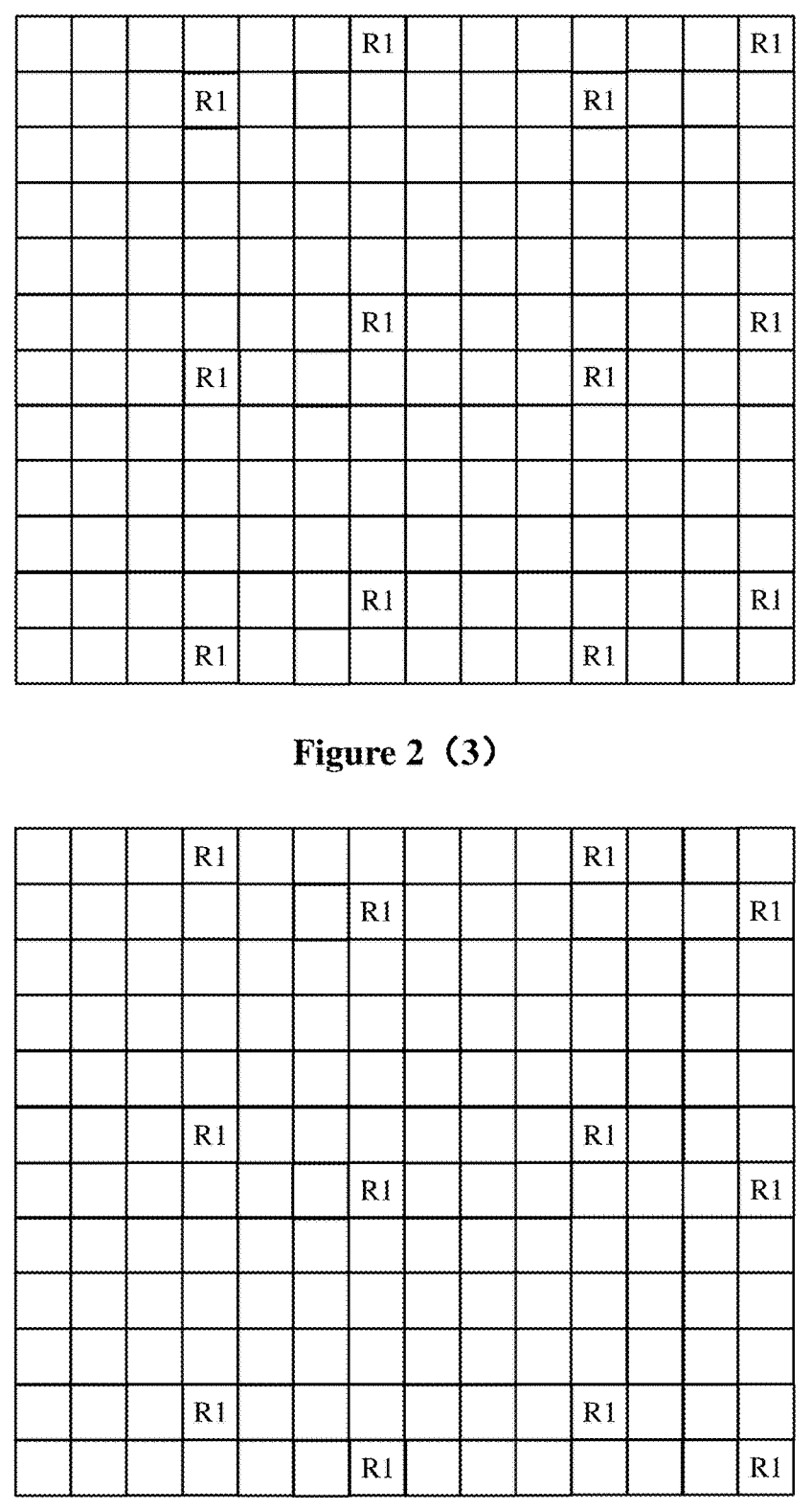

FIG. 2 is a schematic diagram showing configuration examples of trunking-specific reference signals for four ports. FIG. 2 (1) is a schematic diagram showing a trunking-specific reference signal configured for a port 1. FIG. 2 (2) is a schematic diagram showing a trunking-specific reference signal configured for a port 2. FIG. 2 (3) is a schematic diagram showing a trunking-specific reference signal configured for a port 3. FIG. 2 (4) is a schematic diagram showing a trunking-specific reference signal configured for a port 4. As shown in FIG. 2, the ports are configured with different trunking-specific reference signals which are mapped to different positions in a physical resource block and have different values. Positions to which different trunking specific reference signals are mapped in the physical resource block are to be staggered, and are not used for transmitting data. In practice, other positions in the physical resource block may also be used for mapping the dedicated adjustment reference signal configured for the port of the base station, which is not described in detail herein.

It is to be noted here that the above example is only for better understanding of the technical solutions of the present disclosure. In applications, the present disclosure is not limited to the above technical solution.

In step 102, a multi-layer data flow generated through a layer mapping process is acquired.

In step 103, the multi-layer data flow is pre-coded with a preset multi-port pre-coding method to obtain encoded data of each of the transmission trunking ports. The multi-port pre-coding method matches with the preset multiple transmission trunking ports.

The multi-layer data flow is pre-coded with the multi-port pre-coding method which matches with the multiple pre-set transmission trunking ports. That is, an n-port pre-coding method is used based on the number of the transmission trunking ports set for the base station, where n equals to the number of the transmission trunking ports. For example, in a case where two transmission trunking ports are preset for each base station, a two-port pre-coding method is used; in a case where four transmission trunking ports are preset for each base station, a four-port pre-coding method is used; and in a case where eight transmission trunking ports are preset for each base stations, an eight-port pre-coding method is used. Analogously, the number of transmission trunking ports of the base station is determined according to actual conditions, and a multi-port pre-coding method which matches with the number of transmission trunking ports is used.

Specific implementation schemes of the two-port pre-coding method and the four-port pre-coding method are described below.

In a first aspect, the multi-layer data flow may be pre-coded according to the following equation (1) to obtain encoded data of two transmission trunking ports, where Equation (1) is an implementation scheme of the two-port pre-coding method:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}[x^{(k)}(i)] \\ \mathrm{Re}[x^{(k+1)}(i)] \\ \mathrm{Im}[x^{(k)}(i)] \\ \mathrm{Im}[x^{(k+1)}(i)] \end{bmatrix}, \quad (1)$$

where, $y^{(A)}(2i+1)$ and $y^{(A)}(2i+1)$ are encoded data of a transmission trunking port A, $y^{(B)}(2i)$ and $y^{(B)}(2i+1)$ are encoded data of a transmission trunking port B, $\mathrm{Re}\lfloor x^{(0)}(i)\rfloor$ is a real component of i-th data in a zero layer of the data flow, $\mathrm{Re}\lfloor x^{(1)}(i)\rfloor$ is a real component of i-th data in a first layer of the data flow, $\mathrm{Im}\lfloor x^{(0)}(i)\rfloor$ is an imaginary component of the i-th data in the zero layer of the data flow, $\mathrm{Im}\lfloor x^{(1)}(i)\rfloor$ is an imaginary component of the i-th data in the first layer of the data flow, i=0, 1, 2 . . . , M−1, j represents an imaginary component of a complex number, and M represents the number of pieces of data contained in each layer of the data flow, k=0, 1, 2 . . . N−1, N represents the number of layers of the data flow.

Each of the k-th layer and the (k+1)-th layer of the data flow contains i pieces of data, and the k-th layer and the (k+1)-th layer of the data flow are encoded with the two-port pre-coding method to obtain encoded data of the two transmission trunking ports. It can be seen from equation (1) that four pieces of encoded data can be obtained by encoding two pieces of data in the data flow with the two-port pre-coding method. That is, after the layered data flow is encoded with the two-port pre-coding method, data redundancy of the encoded data is doubled as compared to the original layered data flow. On reception of transmission data transmitted by the base station, the UE demodulates the transmission data using the trunking-specific reference signal and obtain transmission data of which the amount is doubled. The decoding accuracy rate at which the UE decodes the transmission data is twice that of the case where no pre-coding is performed in the conventional technology. The UE can decode the transmission data accurately, thus co-frequency networking can be implemented in the trunking service system.

In a second aspect, the multi-layer data flow may be pre-coded according to the following equation (2) to obtain the encoded data of two transmission trunking ports, where equation (2) is an implementation scheme of a four-port pre-coding method:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} \mathrm{Re}[x^{(k)}(i)] \\ \mathrm{Re}[x^{(k+1)}(i)] \\ \mathrm{Re}[x^{(k+2)}(i)] \\ \mathrm{Re}[x^{(k+3)}(i)] \\ \mathrm{Im}[x^{(k)}(i)] \\ \mathrm{Im}[x^{(k+1)}(i)] \\ \mathrm{Im}[x^{(k+2)}(i)] \\ \mathrm{Im}[x^{(k+3)}(i)] \end{bmatrix}, \quad (2)$$

where $y^{(A)}(4i)$, $y^{(A)}(4i+1)$, $y^{(A)}(4i+2)$ and $y^{(A)}(4i+2)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $\mathrm{Re}\lfloor x^{(0)}(i)\rfloor$ is a real component of i-th data in a first layer of the data flow, $\mathrm{Re}\lfloor x^{(1)}(i)\rfloor$ is a real component of i-th data in a second layer of the data flow, $\mathrm{Re}\lfloor x^{(2)}(i)\rfloor$ is a real component of i-th data in a third layer of the data flow, $\mathrm{Re}\lfloor x^{(3)}(i)\rfloor$ is a real component of i-th data in a forth layer of the data flow, $\mathrm{Im}\lfloor x^{(0)}(i)\rfloor$ is an imaginary component of the i-th data in the first layer of the data flow, $\mathrm{Im}\lfloor x^{(1)}(i)\rfloor$ is an imaginary component of the i-th data in the second layer of the data flow, $\mathrm{Im}\lfloor x^{(2)}(i)\rfloor$ is an imaginary component of the i-th data in the third layer of the data flow, $\mathrm{Im}\lfloor x^{(3)}(i)\rfloor$ is an imaginary component of the i-th data in the third layer of the data flow, i=0, 1, 2 . . . , M−1, j represents an imaginary component of a complex number, M represents the number of pieces of data included in each layer of the data flow, k=0, 1, 2 . . . , N−1, N represents the number of layers of the data flow.

Each of the k-th layer, the (k+1)-th layer, the (k+2)-th layer and the (k+3)-th layer of the data flow includes i pieces of data. The k-th layer, the (k+1)-th layer, the (k+2)-th layer and the (k+3)-th layer of the data flow are encoded with the four-port pre-coding method, to obtain encoded data of the four transmission trunking ports. As can be seen from the equation (2), if one piece of data is acquired from each layer of the data flow, and is encoded with the four-port pre-coding method, sixteen pieces of encoded data can be obtained by encoding the obtained four pieces of data. That is, after the layered data flow is encoded with the four-port pre-coding method, data redundancy of the encoded data is increased to four times as compared to the original layered data flow. On reception of transmission data transmitted by the base station, the UE may obtain data of which the amount is increased by three times through demodulation using the trunking-specific reference signal. The decoding accuracy rate at which the UE decodes the transmission data is four times that of the case where no pre-coding is performed in the conventional technology. The UE can decode the transmission data accurately, thus co-frequency networking can be implemented in the trunking service system.

It is to be noted that, in applications, the method for pre-coding the layered data flow is not limited to the two-port pre-coding method and the four-port pre-coding method described above, and an eight-port pre-coding method and the like may also be used. The multi-port pre-coding method matching with the preset multiple transmission trunking ports is selected for pre-coding according actual needs.

In step 104, resource mapping is performed on the encoded data and the trunking-specific reference signal of each of the transmission trunking ports to obtain transmission data of the transmission trunking port.

The multi-layer data flow is pre-coded with the multi-port pre-coding method, to obtain the encoded data of each of the transmission trunking ports. For example, the pre-coding is performed with the two-port pre-coding method to obtain encoded data of two transmission trunking ports, the pre-coding is performed with the four-port pre-coding method to obtain the encoded data of four transmission trunking ports, and so forth. The encoded data of each of the transmission trunking ports can be mapped to only the physical resource block of the transmission trunking port. The trunking-specific reference signal configured for each of the transmission trunking ports can be mapped to only the physical resource block of the transmission trunking port.

It is to be noted that, when the trunking-specific reference signal is configured for each of the transmission trunking ports, not only a value of the trunking-specific reference signal but also a region of the physical resource block to which the trunking-specific reference signal is mapped are configured. For different transmission trunking ports, not only values of trunking-specific reference signals but also regions of the physical resource blocks to which the trunking-specific reference signals are mapped are different.

Taking the four-port pre-coding method as an example, the encoded data $y^{(A)}(4i)$, $y^{(A)}(4i+1)$, $y^{(A)}(4i+2)$ and $y^{(A)}(4i+2)$ of the port A obtained by pre-coding can be mapped to only the physical resource block of the port A, the encoded data $y^{(B)}(4i)$, $y^{(B)}(4i+1)$, $y^{(B)}(4i+2)$ and $y^{(B)}(4i+3)$ of the port B obtained by pre-coding can be mapped to only the physical resource block of the port B, the encoded data $y^{(C)}(4i)$, $y^{(C)}(4i+1)$, $y^{(C)}(4i+2)$ and $y^{(C)}(4i+3)$ of the port C obtained by pre-coding can be mapped to only the physical resource block of the port C, and the encoded data $y^{(D)}(4i)$, $y^{(D)}(4i+1)$, $y^{(D)}(4i+2)$ and $y^{(D)}(4i+3)$ of port D obtained by pre-coding can be mapped to only the physical resource block of the port D.

In general, when resource mapping is performed on the encoded data and the trunking-specific reference signal of each of the transmission trunking ports, the trunking-specific reference signal of the transmission trunking port is first mapped to the physical resource block of the transmission trunking port to obtain a reference resource block, then the encoded data is successively mapped to a blank region in the reference resource block. The specific implementation is described below.

The process of performing resource mapping on the encoded data and the trunking-specific reference signal of each of the transmission trunking ports to obtain transmission data of the transmission trunking port includes:

acquiring the encoded data of each of the transmission trunking ports and the trunking-specific reference signal configured for the transmission trunking port;

performing resource mapping on the trunking-specific reference signal configured for each of the transmission trunking ports to obtain a reference resource block of the transmission trunking port; and mapping the encoded data of each of the transmission trunking ports to a blank region of the reference resource block of the transmission trunking port to obtain the transmission data of the transmission trunking port, where the blank region of the reference resource block is a region of the reference resource block other than a region to which trunking-specific reference signals of all the transmission trunking ports are mapped and a region to which a cell reference signal is mapped.

Figure 3:
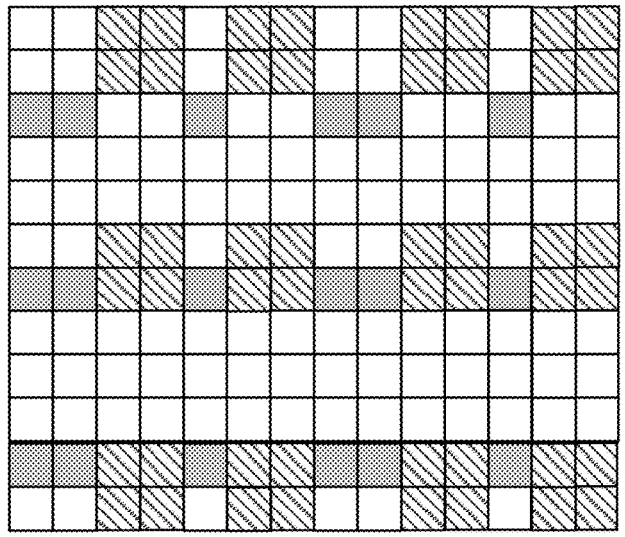
FIG. 3 is a schematic diagram showing a structure of resource mapping according to the present disclosure.

The blank region of the reference resource block is the region of the reference resource block other than the region to which trunking-specific reference signals of all the transmission trunking ports are mapped and the region to which the cell reference signal is mapped. The physical resource block includes not only the region for mapping trunking-specific reference signals but also the region for mapping the cell reference signal, and the region of the physical resource block other than the above regions is a region for mapping the encoded data. As shown in FIG. 3, the gray region represents the region to which the cell reference signal is mapped, the hatched region represents the region to which the trunking-specific reference signal is mapped, and the blank region represents a resource mapping region of the encoded data. FIG. 3 is only for describing resource mapping of the encoded data and the trunking-specific reference signal, and the present disclosure is not limited to the configuration manner of the mapping region shown in FIG. 3.

In practice, resource mapping may be first performed on the encoded data of the transmission trunking port, and then performed on the trunking-specific reference signal of the transmission trunking port, in a manner similar to the above, which is not described herein.

In step 105, the transmission data of each of the transmission trunking ports is transmitted using the transmission trunking port to reception trunking ports which match with the transmission trunking port. The reception trunking ports which match with the transmission trunking port are provided on multiple UEs in a same group in a trunking system, and are configured with the same trunking-specific reference signal as the transmission trunking port.

After the resource mapping is performed on the encoded data and the trunking-specific reference signal of each of the transmission trunking ports of the base station, orthogonal frequency division multiplexing (OFDM) is performed on the physical resource block of each of the transmission trunking ports after the resource mapping, such that the transmission data in the frequency domain is converted into transmission data in the time domain, and the transmission data is transmitted to multiple UEs using the transmission trunking ports.

In a case of transmitting transmission data to multiple UEs, the base station transmits the transmission data of each of the transmission trunking ports using the transmission trunking port to the reception trunking ports on the multiple UEs which match with the transmission trunking port. In a case where the trunking-specific reference signal configured for the transmission trunking port of the base station is the same as the trunking-specific reference signal configured for the reception trunking port of the UE, it is determined that the reception trunking port of the UE matches with the transmission trunking port of the base station.

Each of the base stations is provided with multiple transmission trunking ports, each of the UEs is provided with multiple reception trunking ports, and the number of transmission trunking ports provided on the base station is the same as the number of reception trunking ports provided on the UE. Each of the transmission trunking ports of the base station matches with one of the reception trunking ports of the UE. Correspondingly, each of the reception trunking ports of the UE also matches with one of the transmission trunking ports of the base station.

For example, a case where base stations of three cells cooperating with each other are respectively a base station A, a base station B and a base station C, and each of the base stations is provided with four transmission trunking ports is described as an example. The base station A is provided with four transmission trunking ports A1, A2, A3 and A4, where the transmission trunking port A1 is configured with a trunking-specific reference signal R1, the transmission trunking port A2 is configured with a trunking-specific reference signal R2, the transmission trunking port A3 is configured with a trunking-specific reference signal R3, and the transmission trunking port A4 is configured with a trunking-specific reference signal R4. The base station B is provided with four transmission trunking ports B1, B2, B3 and B4, where the transmission trunking port B1 is configured with the trunking-specific reference signal R1, the transmission trunking port B2 is configured with the trunking-specific reference signal R2, the transmission trunking port B3 is configured with the trunking-specific reference signal R3, and the transmission trunking port B4 is configured with the trunking-specific reference signal R4. The base station C is provided with four transmission trunking ports C1, C2, C3 and C4, where the transmission trunking port C1 is configured with the trunking-specific reference signal R1, the transmission trunking port C2 is configured with the trunking-specific reference signal R2, the transmission trunking port C3 is configured with the trunking-specific reference signal R3, and the transmission trunking port C4 is configured with the trunking-specific reference signal R4.

The trunking service system includes two terminals, that is, a terminal D and a terminal E, and a case where each of the terminals is provided with four reception trunking ports is described as an example. The terminal D is provided with four reception trunking ports D1, D2, D3 and D4, where the transmission trunking port D1 is configured with the trunking-specific reference signal R1, the transmission trunking port D2 is configured with the trunking-specific reference signal R2, the transmission trunking port D3 is configured with the trunking-specific reference signal R3, and the transmission trunking port D4 is configured with the trunking-specific reference signal R4. The terminal E is provided with four reception trunking ports E1, E2, E3 and E4, the transmission trunking port E1 is configured with the trunking-specific reference signal R1, the transmission trunking port E2 is configured with the trunking-specific reference signal R2, the transmission trunking port E3 is configured with the trunking-specific reference signal R3, and the transmission trunking port E4 is configured with the trunking-specific reference signal R4.

The transmission trunking port A1 of the base station A matches with the reception trunking port D1 of the terminal D and the reception trunking port E1 of the terminal E. The transmission trunking port A2 of the base station A matches with the reception trunking port D2 of the terminal D and the reception trunking port E2 of the terminal E. The transmission trunking port A3 of the base station A matches with the reception trunking port D3 of the terminal D and the reception trunking port E3 of the terminal E. The transmission trunking port A4 of the base station A matches with the reception trunking port D4 of the terminal D and the reception trunking port E4 of the terminal E. As can be seen, the transmission trunking port and the reception trunking port which match with each other are configured with the same trunking-specific reference signal. Analogously, the reception trunking ports matching with the transmission trunking ports of the base station B, the base station C, and the base station D can be obtained, which are not described in detail herein.

It is to be noted that, the above example is only for better illustration of the technical solution of the present disclosure, the present disclosure is not limited to the trunking service system including four base stations and two terminals in the above example, but may include more base stations of cooperative cells and terminals for receiving transmission data, which are not described in detail herein.

Second Embodiment

Figure 4:
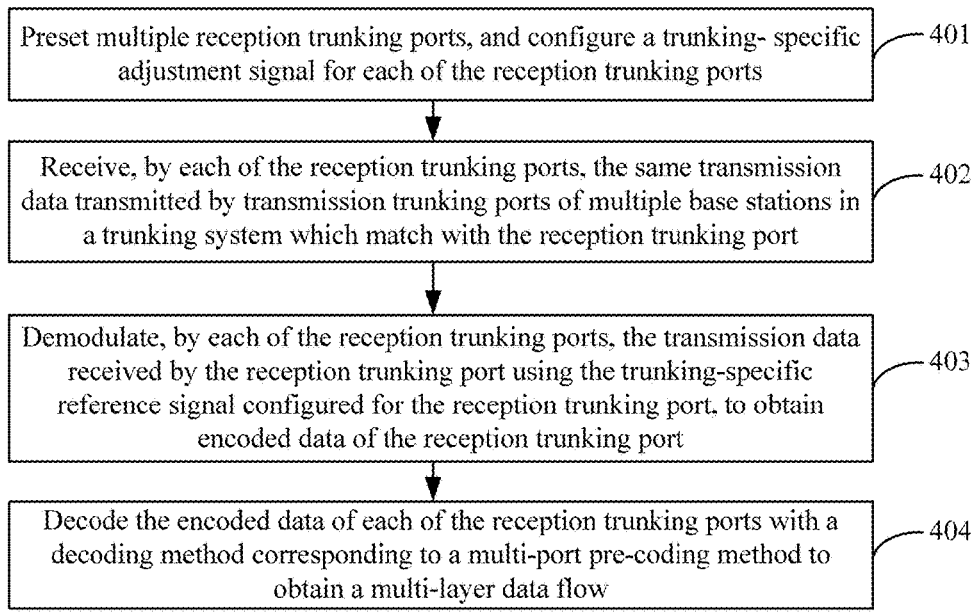
FIG. 4 is a flow chart of a method for co-frequency networking based on a trunking services according to a second embodiment the present disclosure.

FIG. 4 is a flowchart of a method for co-frequency networking based on a trunking service according to a second embodiment of the present disclosure, which can be applied to a UE of a trunking service. The method includes the following step 401 to step 404.

In step 401, multiple reception trunking ports are preset, and each of the reception trunking ports is configured with a trunking-specific reference signal.

In a trunking service system, each UE is provided with multiple reception trunking ports, and each of the reception trunking ports is configured with a trunking-specific reference signal. Each of the reception trunking ports provided on the UE matches with a transmission trunking port of the base station, and the reception trunking port and the transmission trunking port which match with each other are configured with the same trunking-specific reference signal. Each of the reception trunking ports of the UE receives only transmission data transmitted by the transmission trunking port matching with the reception trunking port.

In the co-frequency networking technology, each of the transmission trunking ports of base stations of multiple cooperative cells transmits transmission data to multiple UEs in a trunking service system. Each of the reception trunking ports of each UE receives transmission data transmitted by multiple transmission trunking ports of the base stations which match with the reception trunking ports.

For example, a case where base stations of cooperative cells are respectively a base station A, a base station B and a base station C, and each of the base stations is provided with four transmission trunking ports is described as an example. The base station A is provided with four transmission trunking ports A1, A2, A3 and A4, where the transmission trunking port A1 is configured with a trunking-specific reference signal R1, the transmission trunking port A2 is configured with a trunking-specific reference signal R2, the transmission trunking port A3 is configured with a trunking-specific reference signal R3, and the transmission trunking port A4 is configured with a trunking-specific reference signal R4. The base station B is provided with four transmission trunking ports B1, B2, B3 and B4, where the transmission trunking port B1 is configured with the trunking-specific reference signal R1, the transmission trunking port B2 is configured with the trunking-specific reference signal R2, the transmission trunking port B3 is configured with the trunking-specific reference signal R3, and the transmission trunking port B4 is configured with the trunking-specific reference signal R4. The base station C is provided with four transmission trunking ports C1, C2, C3 and C4, where the transmission trunking port C1 is configured with the trunking-specific reference signal R1, the transmission trunking port C2 is configured with the trunking-specific reference signal R2, the transmission trunking port C3 is configured with the trunking-specific reference signal R3, and the transmission trunking port C4 is configured with the trunking-specific reference signal R4.

The trunking service system includes two terminals, that is, a terminal D and a terminal E, and a case where each of the terminals is provided with four reception trunking ports is described as an example. The terminal D is provided with four reception trunking ports D1, D2, D3 and D4, where the transmission trunking port D1 is configured with the trunking-specific reference signal R1, the transmission trunking port D2 is configured with the trunking-specific reference signal R2, the transmission trunking port D3 is configured with the trunking-specific reference signal R3, and the transmission trunking port D4 is configured with the trunking-specific reference signal R4. The terminal E is provided with four reception trunking ports E1, E2, E3 and E4, where the transmission trunking port E1 is configured with the trunking-specific reference signal R1, the transmission trunking port E2 is configured with the trunking-specific reference signal R2, the transmission trunking port E3 is configured with the trunking-specific reference signal R3, and the transmission trunking port E4 is configured with the trunking-specific reference signal R4.

The reception trunking port D1 of the terminal D receives transmission data transmitted by the transmission trunking port A1 of the base station A, the transmission trunking port B1 of the base station B, the transmission trunking port C1 of the base station C, and the transmission trunking port D2 of the base station D. The reception trunking port D2 of the terminal D receives transmission data transmitted by the transmission trunking port A2 of the base station A, the transmission trunking port B2 of the base station B, the transmission trunking port C2 of the base station C, and the transmission trunking port D2 of the base station D. The reception trunking port D3 of the terminal D receives transmission data transmitted by the transmission trunking port A3 of the base station A, the transmission trunking port B3 of the base station B, the transmission trunking port C3 of the base station C, and the transmission trunking port D3 of the base station D. The reception trunking port D4 of the terminal D receives transmission data transmitted by the transmission trunking port A4 of the base station A, the transmission trunking port B4 of the base station B, the transmission trunking port C4 of the base station C, and the transmission trunking port D4 of the base station D. Analogously, transmission data transmitted by the transmission trunking ports of the base station A, the base station B, the base station C, and the base station D to be received by each of the reception trunking ports of the terminal E can be obtained, which is not described in detail herein.

In step 402, each of the reception trunking ports receive the same transmission data transmitted by the transmission trunking ports of the multiple base stations in the trunking system which match with the reception trunking port. The transmission trunking ports which match with the reception trunking port are configured with the same trunking-specific reference signal as the reception trunking port.

In step 403, each of the reception trunking ports demodulates the transmission data received by the reception trunking port using the trunking-specific reference signal configured for the reception trunking port to obtain encoded data of the reception trunking port.

In step 404, the encoded data of each of the reception trunking ports is decoded with a decoding method corresponding to the multi-port pre-coding method to obtain a multi-layer data flow.

Each of the reception trunking ports of the UE receives transmission data transmitted by transmission trunking ports of multiple base stations which match with the reception trunking port, with the transmission data which is received by the reception trunking port of the UE and transmitted by transmission trunking ports of different base stations which match with the reception trunking port being the same, thereby implementing the co-frequency networking. The UE performs demodulation using the trunking-specific reference signal configured for each of the reception trunking ports to obtain encoded data of the reception trunking port. The encoded data received by the reception trunking port of the UE is encoded with the multi-port pre-coding method and includes redundant data of which the amount is increased by multiple times. In this manner, the UE can demodulate the encoded data using the trunking-dedicated adjusting reference signal at a high accuracy rate.

The main difference of the present disclosure with respect to the conventional technology is as follows. In the conventional technology, the trunking service system cannot estimate the downlink channel condition with the beamforming technology, and the UE receives and demodulates transmission data transmitted by the base station and decodes the transmission data at a low accuracy rate. Therefore, the co-frequency networking technology cannot be implemented in the trunking service. In the present disclosure, the multi-layer data flow is pre-coded with the multi-port pre-coding method to obtain an increased amount of redundant data, thereby improving the accuracy rate at which the UE decodes the received transmission data.

The UE decodes encoded data of each of the reception trunking ports with a decoding method corresponding to the multi-port pre-coding method to obtain a multi-layer data flow. In the trunking service system, each of the UEs receives transmission data transmitted by multiple base stations in the co-frequency networking system. Therefore, the signal of transmission data received by the UE from the base station is enhanced. In addition, the multi-port pre-coding technology is combined with the technology where multiple transmission trunking ports transmit transmission data to implement the co-frequency networking technology in the trunking service system, thereby improving spectrum utilization in the LTE system.

According to the present disclosure, a transmission mode matching with the provided multiple transmission trunking ports, such as a two-port diversity transmission mode or a four-port diversity transmission mode, is used.

It can be seen from the above that the present disclosure has the following beneficial effects.

The multi-layer data flow acquired through the layer mapping process is pre-coded with the multi-port pre-coding method to obtain encoded data of each of the transmission trunking ports, thus data redundancy of the encoded data is increased compared to that of the original multi-layer data flow. Resource mapping is performed on the encoded data to obtain transmission data of multiple transmission trunking ports, and data in each layer of the original data flow is divided into multiple parts and transmitted to the UE, thereby further increasing data redundancy. The pre-coding technology is combined with the transmission technology where multiple transmission trunking ports transmit transmission data, thereby increasing data redundancy of the transmission data received by the UE, thus the accuracy rate at which the UE decodes the transmission data is improved. Multiple base stations transmit the same data to multiple UEs in a trunking service system with the method for co-frequency networking based on a trunking service described above, thereby implementing the co-frequency networking technology in a trunking service system, thus spectrum utilization in the LTE system is improved.

Third Embodiment

Figure 5:
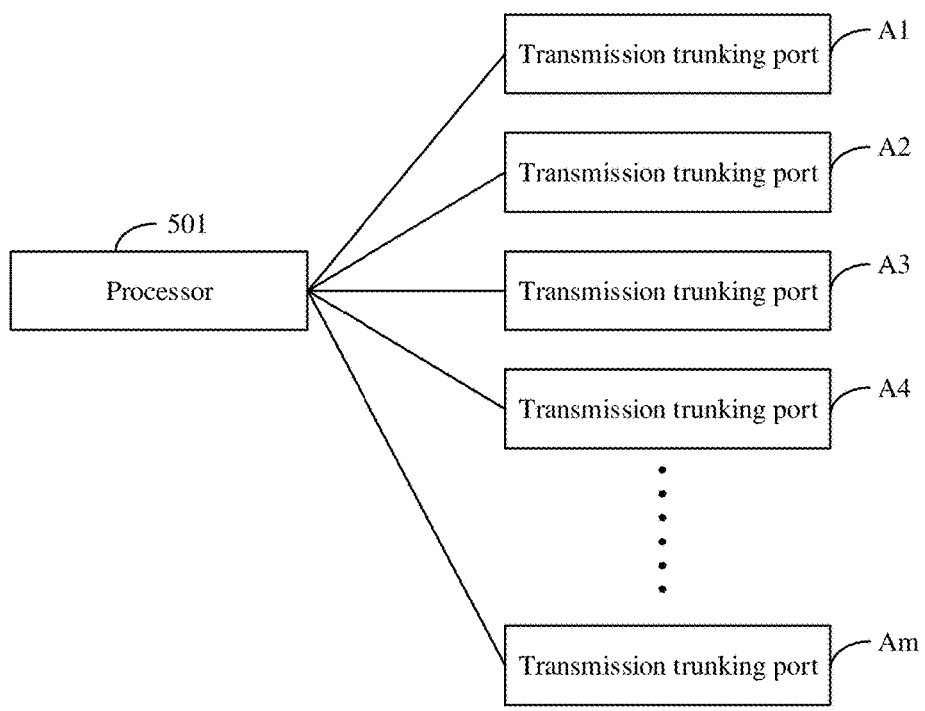
FIG. 5 is a schematic structural diagram of a base station for co-frequency networking based on a trunking service according to a third embodiment the present disclosure.

FIG. 5 is a schematic structural diagram of a base station for co-frequency networking based on a trunking service according to a third embodiment of the present disclosure. The base station in the third embodiment corresponds to the method described in the first embodiment. The base station includes:

a processor 501 and multiple transmission trunking ports A1 to Am. Each of the transmission trunking ports is configured with a trunking-specific reference signal, where m is a natural number greater than one.

The processor 501 is configured to: acquire a multi-layer data flow generated through a layer mapping process; pre-code the multi-layer data flow with a preset multi-port pre-coding method to obtain encoded data of each of the transmission trunking ports, where the multi-port pre-coding method matches with the preset multiple transmission trunking ports; perform resource mapping on the encoded data and the trunking-specific reference signal of each of the transmission trunking ports to obtain transmission data of the transmission trunking port; and transmit the transmission data of each of the transmission trunking ports to the transmission trunking port.

The reception trunking ports matching with the transmission trunking port are on multiple user equipments UEs in a same group in the trunking system, and are configured with the same trunking-specific reference signal as the transmission trunking port.

In a specific embodiment, for performing resource mapping on the encoded data and the trunking-specific reference signal of each of the transmission trunking ports to obtain the transmission data of the transmission trunking port, the processor 501 is configured to:

acquire the encoded data of each of the transmission trunking ports and the trunking-specific reference signal configured for the transmission trunking port;

perform resource mapping on the trunking-specific reference signal configured for each of the transmission trunking ports to obtain a reference resource block of the transmission trunking port; and map the encoded data of each of the transmission trunking ports to a blank region of the reference resource block of the transmission trunking port to obtain transmission data of the transmission trunking port, where the blank region of the reference resource block is a region of the reference resource block other than a region to which trunking-specific reference signals of all the transmission trunking ports are mapped and a region to which a cell reference signal is mapped.

Each of the transmission trunking ports is configured to: receive the transmission data transmitted by the processor; and transmit the received transmission data to reception trunking ports which match with the transmission trunking port using the transmission trunking port. The reception trunking ports which match with the transmission trunking port are provided on multiple UEs in a same group in a trunking system, and are configured with the same trunking-specific reference signal as the transmission trunking port.

In a specific embodiment, for pre-coding the multi-layer data flow with the preset multi-port pre-coding method, the processor 501 is configured to:

pre-code the multi-layer data flow with a two-port pre-coding method in a case where two transmission trunking ports are preset; and pre-code the multi-layer data flow with a four-port pre-coding method in a case where four transmission trunking ports are preset.

For pre-coding the multi-layer data flow with the two-port pre-coding method, the processor is configured to pre-code the multi-layer data flow according to the following equation:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}[x^{(k)}(i)] \\ \text{Re}[x^{(k+1)}(i)] \\ \text{Im}[x^{(k)}(i)] \\ \text{Im}[x^{(k+1)}(i)] \end{bmatrix};$$

where, $y^{(A)}(2i)$ and $y^{(A)}(2i+1)$ are encoded data of a transmission trunking port A, $y^{(B)}(2i)$ and $y^{(B)}(2i+1)$ are encoded data of a transmission trunking port B, $\text{Re}[x^{(0)}(i)]$ is a real component of i-th data in a zero layer of the data flow, $\text{Re}[x^{(1)}(i)]$ is a real component of i-th data in a first layer of the data flow, $\text{Im}[x^{(0)}(i)]$ is an imaginary component of the i-th data in the zero layer of the data flow, $\text{Im}[x^{(1)}(i)]$ is an imaginary component of the i-th data in the first layer of the data flow, i=0, 1, 2 . . . , M−1, j represents an imaginary component of a complex number, and M represents the number of pieces of data contained in each layer of the data flow, k=0, 1, 2 . . . , N−1, N represents the number of layers of the data flow.

For pre-coding the multi-layer data flow with the four-port pre-coding method, the processor is configured to pre-code the multi-layer data flow according to the following equation:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} \text{Re}[x^{(k)}(i)] \\ \text{Re}[x^{(k+1)}(i)] \\ \text{Re}[x^{(k+2)}(i)] \\ \text{Re}[x^{(k+3)}(i)] \\ \text{Im}[x^{(k)}(i)] \\ \text{Im}[x^{(k+1)}(i)] \\ \text{Im}[x^{(k+2)}(i)] \\ \text{Im}[x^{(k+3)}(i)] \end{bmatrix};$$

where, $y^{(A)}(4i)$, $y^{(A)}(4i+1)$, $y^{(A)}(4i+2)$ and $y^{(A)}(4i+2)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $Re\lfloor x^{(0)}(i) \rfloor$ is a real component of i-th data in a first layer of the data flow, $Re\lfloor x^{(1)}(i) \rfloor$ is a real component of i-th data in a second layer of the data flow, $Re\lfloor x^{(2)}(i) \rfloor$ is a real component of i-th data in a third layer of the data flow, $Re\lfloor x^{(3)}(i) \rfloor$ is a real component of i-th data in a forth layer of the data flow, $Im\lfloor x^{(0)}(i) \rfloor$ is an imaginary component of the i-th data in the first layer of the data flow, $Im\lfloor x^{(1)}(i) \rfloor$ is an imaginary component of the i-th data in the second layer of the data flow, $Im\lfloor x^{(2)}(i) \rfloor$ is an imaginary component of the i-th data in the third layer of the data flow, $Im\lfloor x^{(3)}(i) \rfloor$ is an imaginary component of the i-th data in the third layer of the data flow, $i=0, 1, 2 \ldots, M-1$, j represents an imaginary component of a complex number, M represents the number of pieces of data contained in each layer of the data flow, $k=0, 1, 2 \ldots, N-1$, N represents the number of layers of the data flow.

The base station in the third embodiment corresponds to the method described in the first embodiment, and the implementation is similar to that of the first embodiment. One can refer to the first embodiment for the implementation, which is not described herein.

Fourth Embodiment

Figure 6:
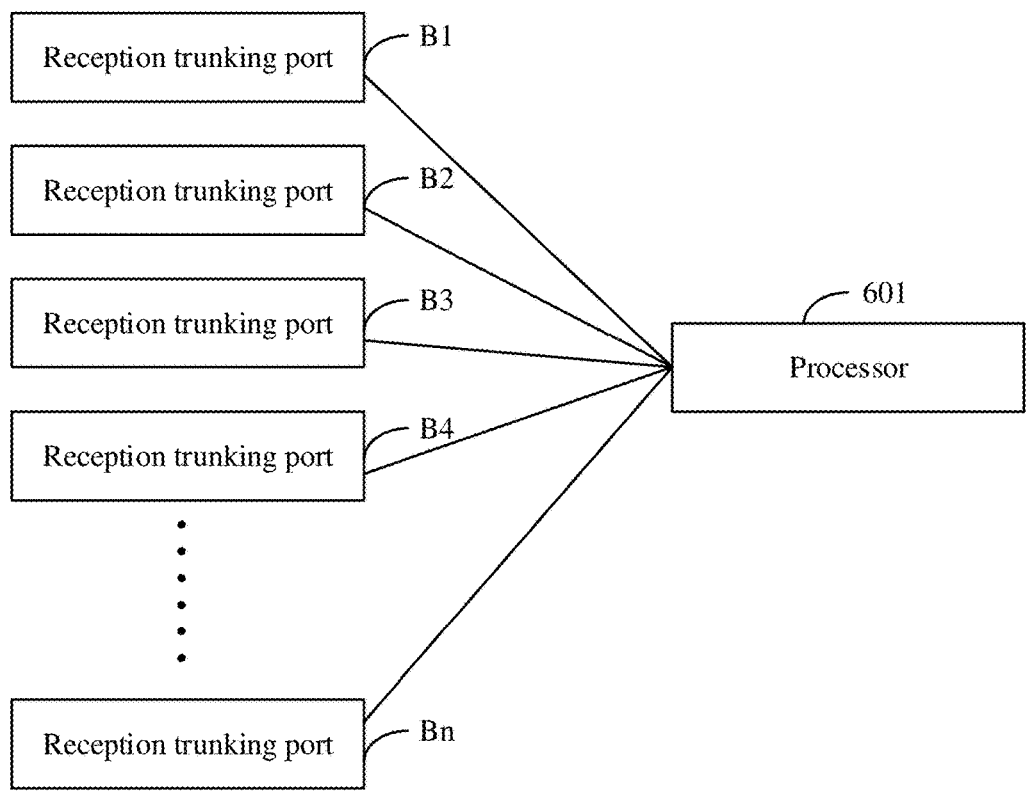
FIG. 6 is a schematic structural diagram of a terminal for co-frequency networking based on a trunking service according to a fourth embodiment of the present disclosure.

FIG. 6 is a schematic structural diagram of a terminal for co-frequency networking based on a trunking service according to a fourth embodiment of the present disclosure. The terminal in the fourth embodiment corresponds to the method described in the second embodiment. The terminal includes:

a processor 601 and multiple reception trunking ports B1 to Bn, where n is a natural number greater than one. Each of the reception trunking ports is configured with a trunking-specific reference signal.

Each of the reception trunking ports is configured to: receive transmission data transmitted by transmission trunking ports of multiple base stations in a same group in a trunking system which match with the reception trunking port; and transmit the received transmission data to the processor. The transmission trunking ports which match with the reception trunking port are configured with the same trunking-specific reference signal as the reception trunking port.

The processor 601 is configured to: receive transmission data transmitted by each of the reception trunking ports; demodulate transmission data received by each of the reception trunking ports using the trunking-specific reference signal configured for the trunking port, to obtain encoded data of the reception trunking port; and decode the encoded data of each of the reception trunking ports with a decoding method corresponding to the multi-port pre-coding method to obtain a multi-layer data flow.

The terminal in the fourth embodiment corresponds to the method described in the second embodiment, and the implementation is similar to that of the second embodiment. One can refer to the second embodiment for the implementation, which is not described herein.

Fifth Embodiment

Figure 7:
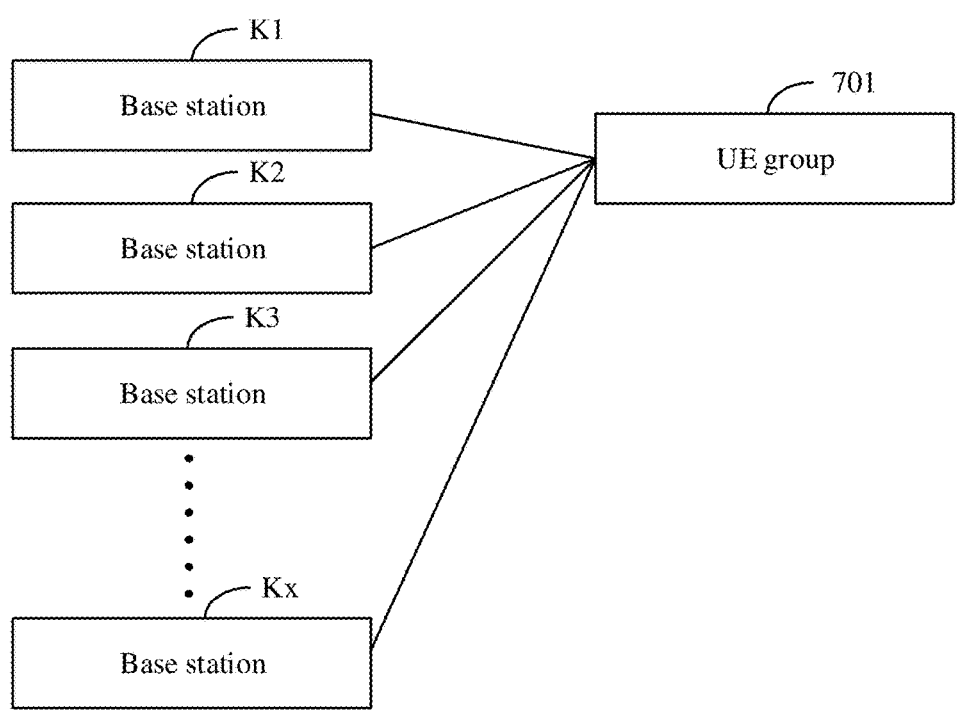
FIG. 7 is a schematic structural diagram showing a system for co-frequency networking based on a trunking service according to a fifth embodiment of the present disclosure.

FIG. 7 is a schematic structural diagram showing a system for co-frequency networking based on a trunking service according to a fifth embodiment of the present disclosure. The system includes:

multiple base stations K1 to Kx for co-frequency networking based on a trunking service according to the third embodiment and a user equipment UE group 701, the UE group 701 includes multiple terminals for co-frequency networking based on a trunking service according to the fourth embodiment, where x and y are both natural numbers greater than one.

Each of the base stations is provided with multiple transmission trunking ports, and each of the terminals in the UE group 701 is provided with multiple reception trunking ports. The number of the transmission trunking ports of the base station is the same as the number of the reception trunking ports of the terminal, and the transmission trunking ports of the base station respectively match with the reception trunking ports of the terminal. The transmission trunking port is configured with the same trunking specific adjustment signal as the reception trunking port which matches with the transmission trunking port.

Each of the transmission trunking ports of the base stations transmits the same transmission data to the reception trunking ports of all of the terminals in the UE group which match with the transmission trunking port; and each of the reception trunking ports of the terminals in the UE group receives the same transmission data transmitted by transmission trunking ports of all of the base stations which match with the reception trunking port.

One can refer to the first embodiment and the second embodiment for the detailed description, which is not described herein.

The above are only preferred embodiments of the present disclosure. It should be noted that numerous improvements and modifications can further be made by those skilled in the art without being departing from the principle of the present disclosure, and these improvements and modifications should also fall within the protection scope of the present disclosure.

The invention claimed is:

1. A method for co-frequency networking based on a trunking service, wherein a plurality of transmission trunking ports are preset, and each of the transmission trunking ports is configured with a trunking-specific reference signal, the method comprises:
    acquiring a multi-layer data flow generated through a layer mapping process;
    pre-coding the multi-layer data flow with a preset multi-port pre-coding method to obtain encoded data of each of the transmission trunking ports, wherein the multi-port pre-coding method matches with the preset plurality of transmission trunking ports;
    performing resource mapping on the encoded data and the trunking-specific reference signal of each of the transmission trunking ports to obtain transmission data of the transmission trunking port; and
    transmitting the transmission data of each of the transmission trunking ports to reception trunking ports which match with the transmission trunking port using the transmission trunking port, wherein the reception trunking ports which match with the transmission trunking port are provided on a plurality of user equipments UEs in a same group in a trunking system, and are configured with the same trunking-specific reference signal as the transmission trunking port.

2. The method according to claim 1, wherein the pre-coding the multi-layer data flow with the preset multi-port pre-coding method comprises:

pre-coding the multi-layer data flow with a two-port pre-coding method in a case where two transmission trunking ports are preset; and
pre-coding the multi-layer data flow with a four-port pre-coding method in a case where four transmission trunking ports are preset.

3. The method according to claim 2, wherein the pre-coding the multi-layer data flow with the two-port pre-coding method comprises:
pre-coding the multi-layer data flow according to the following equation:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}[x^{(k)}(i)] \\ \mathrm{Re}[x^{(k+1)}(i)] \\ \mathrm{Im}[x^{(k)}(i)] \\ \mathrm{Im}[x^{(k+1)}(i)] \end{bmatrix};$$

wherein $y^{(A)}(2i)$ and $y^{(A)}(2i+1)$ are encoded data of a transmission trunking port A, $y^{(B)}(2i)$ and $y^{(B)}(2i+1)$ are encoded data of a transmission trunking port B, $\mathrm{Re}[x^{(0)}(i)]$ is a real component of i-th data in a first layer of the data flow, $\mathrm{Re}[x^{(1)}(i)]$ is a real component of i-th data in a second layer of the data flow, $\mathrm{Im}[x^{(0)}(i)]$ is an imaginary component of the i-th data in the first layer of the data flow, $\mathrm{Im}[x^{(1)}(i)]$ is an imaginary component of the i-th data in the second layer of the data flow, i=0, 1, 2 . . . , M−1, j represents an imaginary component of a complex number, and M represents the number of pieces of data contained in each layer of the data flow, k=0, 1, 2 . . . N−1, N represents the number of layers of the data flow.

4. The method according to claim 2, wherein the pre-coding the multi-layer data flow with the four-port pre-coding method comprises:
pre-coding the multi-layer data flow according to the following equation:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} \mathrm{Re}[x^{(k)}(i)] \\ \mathrm{Re}[x^{(k+1)}(i)] \\ \mathrm{Re}[x^{(k+2)}(i)] \\ \mathrm{Re}[x^{(k+3)}(i)] \\ \mathrm{Im}[x^{(k)}(i)] \\ \mathrm{Im}[x^{(k+1)}(i)] \\ \mathrm{Im}[x^{(k+2)}(i)] \\ \mathrm{Im}[x^{(k+3)}(i)] \end{bmatrix};$$

where $y^{(A)}(4i)$, $y^{(A)}(4i+1)$, $y^{(A)}(4i+2)$ and $y^{(A)}(4i+3)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $\mathrm{Re}[x^{(0)}(i)]$ is a real component of i-th data in a first layer of the data flow, $\mathrm{Re}[x^{(1)}(i)]$ is a real component of i-th data in a second layer of the data flow, $\mathrm{Re}[x^{(2)}(i)]$ is a real component of i-th data in a third layer of the data flow, $\mathrm{Re}[x^{(3)}(i)]$ is a real component of i-th data in a forth layer of the data flow, $\mathrm{Im}[x^{(0)}(i)]$ is an imaginary component of the i-th data in the first layer of the data flow, $\mathrm{Im}[x^{(1)}(i)]$ is an imaginary component of the i-th data in the second layer of the data flow, $\mathrm{Im}[x^{(2)}(i)]$ is an imaginary component of the i-th data in the third layer of the data flow, $\mathrm{Im}[x^{(3)}(i)]$ is an imaginary component of the i-th data in the third layer of the data flow, i=0, 1, 2 . . . , M−1, j represents an imaginary component of a complex number, M represents the number of pieces of data contained in each layer of the data flow, k=0, 1, 2 . . . N−1, N represents the number of layers of the data flow.

5. A base station for co-frequency networking based on a trunking service, comprising a processor and a plurality of transmission trunking ports, wherein:
each of the transmission trunking ports is configured with a trunking-specific reference signal; and
the processor is configured to:
acquire a multi-layer data flow generated through a layer mapping process,
pre-code the multi-layer data flow with a preset multi-port pre-coding method to obtain encoded data of each of the transmission trunking ports, wherein the multi-port pre-coding method matches with the preset plurality of transmission trunking ports,
perform resource mapping on the encoded data and the trunking-specific reference signal of each of the transmission trunking ports to obtain transmission data of the transmission trunking port, and
transmit the transmission data of each of the transmission trunking ports to the transmission trunking port; and
each of the transmission trunking ports is configured to:
receive the transmission data transmitted by the processor, and
transmit the received transmission data to reception trunking ports which match with the transmission trunking port using the transmission trunking port, wherein the reception trunking ports which match with the transmission trunking port are provided on a plurality of user equipments UEs in a same group in a trunking system, and are configured with the same trunking-specific reference signal as the transmission trunking port.

6. The base station according to claim 5, wherein for pre-coding the multi-layer data flow with the preset multi-port pre-coding method, the processor is configured to:
pre-code the multi-layer data flow with a two-port pre-coding method in a case where two transmission trunking ports are preset; and
pre-code the multi-layer data flow with a four-port pre-coding method in a case where four transmission trunking ports are preset.

7. The base station according to claim 6, wherein for pre-coding the multi-layer data flow with the two-port pre-coding method, the processor is configured to pre-code the multi-layer data flow according to the following equation:

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}[x^{(k)}(i)] \\ \text{Re}[x^{(k+1)}(i)] \\ \text{Im}[x^{(k)}(i)] \\ \text{Im}[x^{(k+1)}(i)] \end{bmatrix};$$

wherein $y^{(A)}(2i)$ and $y^{(A)}(2i+1)$ are encoded data of a transmission trunking port A, $y^{(B)}(2i)$ and $y^{(B)}(2i+1)$ are encoded data of a transmission trunking port B, $\text{Re}[x^{(0)}(i)]$ is a real component of i-th data in a zero layer of the data flow, $\text{Re}[x^{(1)}(i)]$ is a real component of i-th data in a first layer of the data flow, $\text{Im}[x^{(0)}(i)]$ is an imaginary component of the i-th data in the zero layer of the data flow, $\text{Im}[x^{(1)}(i)]$ is an imaginary component of the i-th data in the first layer of the data flow, i=0, 1, 2 . . . , M−1, j represents an imaginary component of a complex number, and M represents the number of pieces of data contained in each layer of the data flow, k=0, 1, 2 . . . N−1, N represents the number of layers of the data flow.

8. The base station according to claim 6, wherein for pre-coding the multi-layer data flow with the four-port pre-coding method, the processor is configured to pre-code the multi-layer data flow according to the following equation:

$$\begin{bmatrix} y^{(A)}(4i) \\ y^{(B)}(4i) \\ y^{(C)}(4i) \\ y^{(D)}(4i) \\ y^{(A)}(4i+1) \\ y^{(B)}(4i+1) \\ y^{(C)}(4i+1) \\ y^{(D)}(4i+1) \\ y^{(A)}(4i+2) \\ y^{(B)}(4i+2) \\ y^{(C)}(4i+2) \\ y^{(D)}(4i+2) \\ y^{(A)}(4i+3) \\ y^{(B)}(4i+3) \\ y^{(C)}(4i+3) \\ y^{(D)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & 0 & -j \end{bmatrix} \begin{bmatrix} \text{Re}[x^{(k)}(i)] \\ \text{Re}[x^{(k+1)}(i)] \\ \text{Re}[x^{(k+2)}(i)] \\ \text{Re}[x^{(k+3)}(i)] \\ \text{Im}[x^{(k)}(i)] \\ \text{Im}[x^{(k+1)}(i)] \\ \text{Im}[x^{(k+2)}(i)] \\ \text{Im}[x^{(k+3)}(i)] \end{bmatrix};$$

where $y^{(A)}(4i)$, $y^{(A)}(4i+1)$, $y^{(A)}(4i+2)$ and $y^{(A)}(4i+3)$ are encoded data of a transmission trunking port A, $y^{(B)}(4i)$, $y^{(B)}(4i+1)$, $y^{(B)}(4i+2)$ and $y^{(B)}(4i+3)$ are encoded data of a transmission trunking port B, $y^{(C)}(4i)$, $y^{(C)}(4i+1)$, $y^{(C)}(4i+2)$ and $y^{(C)}(4i+3)$ are encoded data of a transmission trunking port C, $y^{(D)}(4i)$, $y^{(D)}(4i+1)$, $y^{(D)}(4i+2)$ and $y^{(D)}(4i+3)$ are encoded data of a transmission trunking port D, $\text{Re}[x^{(0)}(i)]$ is a real component of i-th data in a first layer of the data flow, $\text{Re}[x^{(1)}(i)]$ is a real component of i-th data in a second layer of the data flow, $\text{Re}[x^{(2)}(i)]$ is a real component of i-th data in a third layer of the data flow, $\text{Re}[x^{(3)}(i)]$ is a real component of i-th data in a forth layer of the data flow, $\text{Im}[x^{(0)}(i)]$ is an imaginary component of the i-th data in the first layer of the data flow, $\text{Im}[x^{(1)}(i)]$ is an imaginary component of the i-th data in the second layer of the data flow, $\text{Im}[x^{(2)}(i)]$ is an imaginary component of the i-th data in the third layer of the data flow, $\text{Im}[x^{(3)}(i)]$ is an imaginary component of the i-th data in the third layer of the data flow, i=0, 1, 2 . . . , M−1, j represents an imaginary component of a complex number, M represents the number of pieces of data contained in each layer of the data flow, k=0, 1, 2 . . . N−1, N represents the number of layers of the data flow.

9. A terminal for co-frequency networking based on a trunking service, comprising a plurality of reception trunking ports and a processor, wherein:
each of the reception trunking ports is configured with a trunking-specific reference signal, and is configured to:
receive the same transmission data transmitted by transmission trunking ports of a plurality of base stations in a trunking system which match with the reception trunking port, and
transmit the received transmission data to the processor, wherein the transmission trunking ports which match with the reception trunking port are configured with the same trunking-specific reference signal as the reception trunking port; and
the processor is configured to:
receive the transmission data transmitted by each of the reception trunking ports,
demodulate the transmission data received by each of the reception trunking ports using the trunking-specific reference signal configured for the trunking port, to obtain encoded data of the reception trunking port, and
decode the encoded data of each of the reception trunking ports with a decoding method corresponding to a multi-port pre-coding method to obtain a multi-layer data flow.

* * * * *